US012244992B2

(12) United States Patent
Rachoori

(10) Patent No.: US 12,244,992 B2
(45) Date of Patent: Mar. 4, 2025

(54) EAR BUD ACTIVE USE CHARGING SYSTEM AND METHOD

(71) Applicant: DISH Network Technologies India Private Limited, Bangalore (IN)

(72) Inventor: Sandeep Rachoori, Bengaluru (IN)

(73) Assignee: DISH Network Technologies India Private Limited, Bangalore (IN)

( * ) Notice: Subject to any disclaimer, the term of this patent is extended or adjusted under 35 U.S.C. 154(b) by 193 days.

(21) Appl. No.: 17/943,003

(22) Filed: Sep. 12, 2022

(65) Prior Publication Data

US 2024/0089648 A1 Mar. 14, 2024

(51) Int. Cl.
*H04R 1/10* (2006.01)

(52) U.S. Cl.
CPC ......... *H04R 1/1025* (2013.01); *H04R 1/1033* (2013.01); *H04R 1/1041* (2013.01); *H04R 1/1066* (2013.01); *H04R 1/1016* (2013.01); *H04R 2225/31* (2013.01); *H04R 2420/07* (2013.01); *H04R 2420/09* (2013.01)

(58) Field of Classification Search
CPC .. H04R 1/1016; H04R 1/1025; H04R 1/1033; H04R 1/1041; H04R 1/1066; H04R 2225/31; H04R 2420/07; H04R 2420/09
See application file for complete search history.

(56) References Cited

U.S. PATENT DOCUMENTS

2014/0355779 A1* 12/2014 Pusey .................. H04R 1/1033 381/74
2018/0083468 A1* 3/2018 Dennis .................... H02J 7/342
2020/0304900 A1* 9/2020 Lalvani ................ H04R 1/1025
2023/0292029 A1* 9/2023 Alam ...................... H02J 50/10

* cited by examiner

*Primary Examiner* — Huyen D Le
(74) *Attorney, Agent, or Firm* — Seed IP Law Group LLP

(57) ABSTRACT

An ear bud active use charging system is disclosed. The ear bud active use charging system includes: a pair of loop charging harnesses, a pair of charging wires, a power receiving interface, a charge cable, and an ear bud charging controller system. The pair of loop charging harnesses interface with one or more of the ear buds. The pair of charging wires each have a first end and a second end. The first end of each pair of charging wires is connected to one of the pair of loop charging harnesses. The second end of each pair of charging wires is connected to a junction section. The charge cable connects to the power receiving interface at a first end and the junction section at a second end. The ear bud charging controller system has a processor and a memory.

19 Claims, 6 Drawing Sheets

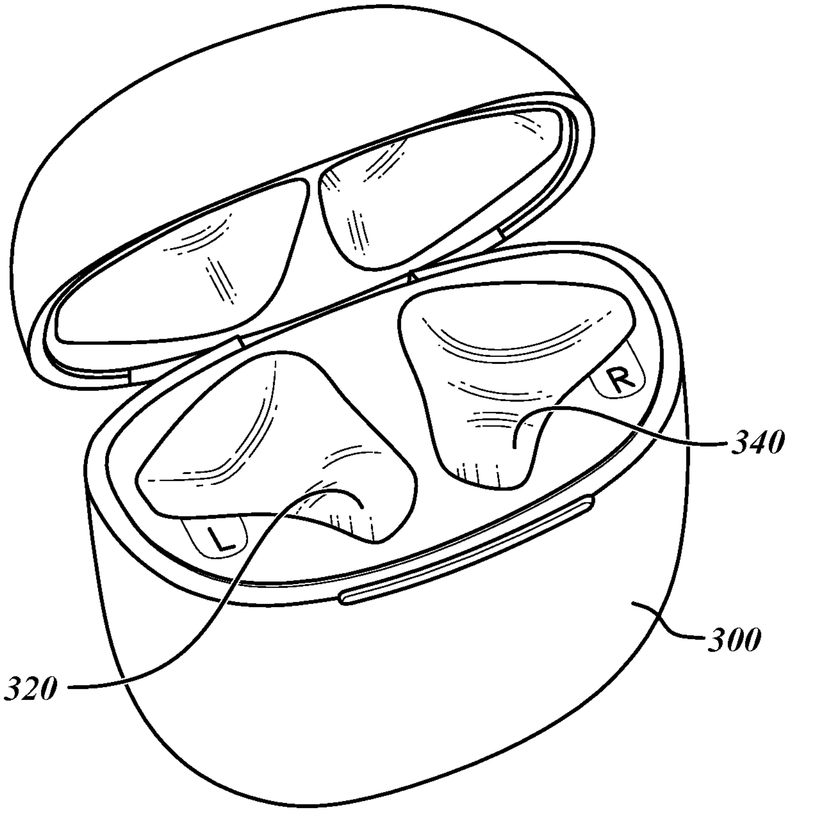
FIG.3
Prior Art
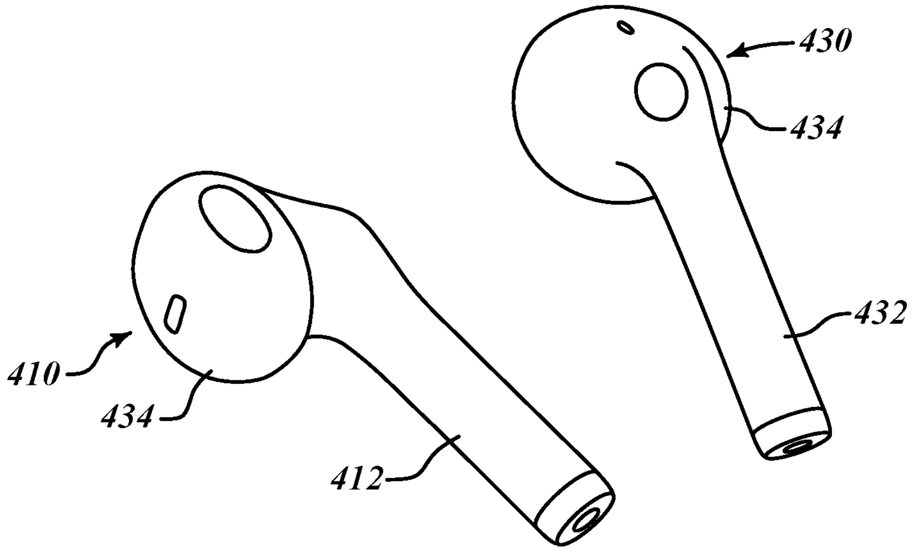
FIG.4 - Prior Art

EAR BUD ACTIVE USE CHARGING SYSTEM AND METHOD

BACKGROUND

The proliferation of electronic mobile devices appears to be growing at an ever increasing rate. Many of these electronic mobile devices rely on rechargeable batteries as a source of power.

Additionally, wearable audio devices are now used with a wide variety of portable electronic devices such as portable computers, laptop computers, tablets, smart phones, and portable music players. Many of these wearable audio devices are wired devices that connect wearable speakers to the portable electronic devices via a wire. The audio signal is transmitted via this wire. Such wired wearable audio devices typically draw power from the connection to the portable electronic devices via the same wire that is used to transmit the power. While this is a convenience configuration for some situations, there are other situations where having a wired connection between the wearable speakers and the portable electronic device is problematic. Such potential problems include the connecting wire being too short, the wire becoming tangled with other objects, and the wire pulling the wearable speakers away from the user's ears unintentionally.

Wireless wearable speakers provide a solution to some of these problems since they have a longer range than a physical wire and they do not use a wire that can become entangled with other objects. However, wireless wearable speakers have their own set of drawbacks. A main drawback of wireless wearable speakers is that they must rely on internal batteries for power. When these wireless wearable speakers have drained their internal batteries, they must be removed and charged, during which time they cannot be used. This is a significant problem if the wireless wearable speakers are the user's only acceptable mode of receiving audio sounds.

BRIEF SUMMARY

The present disclosure relates generally to a headphone charging system and method, and more particularly, but not exclusively, to an ear bud charging system and method. The present disclosure is directed towards an ear bud active use charging system and method for concurrent use and battery charging. In at least one implementation, the ear bud active use charging system includes: a pair of loop charging harnesses, a pair of charging wires, a power receiving interface, a charge cable, and an ear bud charging controller system. The pair of loop charging harnesses interface with one or more of the ear buds. The pair of charging wires each have a first end and a second end. The first end of each pair of charging wires is connected to one of the pair of loop charging harnesses. The second end of each pair of charging wires is connected to a junction section. The charge cable connects to the power receiving interface at a first end and the junction section at a second end. The ear bud charging controller system has a processor and a memory.

In some embodiments, the memory is arranged to store computer instructions, and the computer instructions are executable by the processor. Accordingly, the ear bud charging controller system configured to: detect, via an ear bud detector, one or more wireless ear buds that are connected by one or more of the pair of loop charging harnesses; determine, via a charge sensor, an initial charged state of the one or more wireless ear buds; applying, via ear bud charging circuitry, a charging profile to a battery in each of the one or more wireless ear buds in response to the determined initial charged state of the one or more wireless ear buds; monitor, via the charge sensor, a present charging status and charged state of the one or more wireless ear buds; display, via a charge indicator, the present charging status and the charged state of the one or more wireless ear buds; and reduce, via the ear bud charging circuitry, the charging profile to the one or more wireless ear buds when the battery in each of the one or more wireless ear buds is fully charged or within a predetermined charge threshold of fully charged.

In one or more embodiments, the charge cable is configured to interface with a phone charging port. In other embodiments, the charge cable is configured to interface with a mobile battery. In still other embodiments, the charge cable is configured to interface with an electrical outlet. In another aspect of some embodiments, the pair of loop charging harnesses includes magnetic elements that facilitate enhanced connection with the ear buds. In still another aspect of some embodiments, a size of the loop harnesses is adjustable to fit various styles of charging arms of wireless headphones. In yet another aspect of some embodiments, the ear bud active use charging system transfers a quantity of charge that enables use of the ear buds without internal battery power from the ear buds.

Moreover, in some embodiments, the charge indicator displays an indication that the ear bud active use charging system is actively charging the one or more ear buds. In another aspect of some embodiments, the charge indicator displays a current percent charging status while the ear bud active use charging system is actively charging the one or more ear buds. In still another aspect of some embodiments, the ear bud active use charging system transmits power from the pair of loop charging harnesses to the one or more ear buds using inductive charging.

In other embodiments of the ear bud active use method, the method includes: detecting, via an ear bud detector, one or more wireless ear buds that are connected by one or more of the pair of loop charging harnesses; determining, via a charge sensor, an initial charged state of the one or more wireless ear buds; applying, via ear bud charging circuitry, a charging profile to a battery in each of the one or more wireless ear buds in response to the determined initial charged state of the one or more wireless ear buds; monitoring, via the charge sensor, a present charging status and charged state of the one or more wireless ear buds; displaying, via a charge indicator, the present charging status and the charged state of the one or more wireless ear buds; and reducing, via the ear bud charging circuitry, the charging profile to the one or more wireless ear buds when the battery in each of the one or more wireless ear buds is fully charged or within a predetermined charge threshold of fully charged.

In some embodiments, the ear bud active use method further comprises: enabling the charge cable to interface with one or more of a phone charging port, a mobile battery, or an electrical outlet. In another aspect of some embodiments, the ear bud active use method further comprises: enhancing connection with the ear buds using magnetic elements in the pair of loop charging harnesses. In still another aspect of some embodiments, the ear bud active use method further comprises: enabling adjustment of a size of the loop harnesses to fit various styles of charging arms of wireless headphones.

In yet another aspect of some embodiments, the ear bud active use method further comprises: transferring a quantity of charge that enables use of the ear buds without internal battery power from the ear buds. Also, in another aspect of some embodiments, the ear bud active use method further comprises: displaying a current percent charging status on the charge indicator while the ear bud active use charging system is actively charging the one or more ear buds. Moreover, in another aspect of some embodiments, the ear bud active use method further comprises: transmitting power from the pair of loop charging harnesses to the one or more ear buds using inductive charging.

In still other embodiments of a head-mounted electronics active use system, the system includes: a pair of loop charging harnesses, a pair of charging wires, a power receiving interface, a charge cable, and a head-mounted electronics charging controller system. The pair of loop charging harnesses interface with the head-mounted electronics. The pair of charging wires each has a first end and a second end. The first end of each pair of charging wires is connected to one of the pair of loop charging harnesses. The second end of each pair of charging wires is connected to a junction section. The charge cable connects to the power receiving interface at a first end and the junction section at a second end. The head-mounted electronics charging controller system has a processor and a memory.

In another aspect of some embodiments, the pair of loop charging harnesses are configured to interface with one or more of ear bud charging arms, a VR headset charging interface, or an AR glasses charging interface. In still another aspect of some embodiments, the head-mounted electronics active use system transfers a quantity of charge that enables use of the head-mounted electronics without internal battery power from the head-mounted electronics.

These features with other technological improvements, which will become subsequently apparent, reside in the details of construction and operation as more fully described hereafter and claimed, reference being had to the accompanying drawings forming a part hereof.

BRIEF DESCRIPTION OF THE DRAWINGS

The present application will be more fully understood by reference to the following figures, which are for illustrative purposes only. The figures are not necessarily drawn to scale and elements of similar structures or functions are generally represented by like reference numerals for illustrative purposes throughout the figures. The figures are only intended to facilitate the description of the various embodiments described herein. The figures do not describe every aspect of the teachings disclosed herein and do not limit the scope of the claims.

FIG. 3 illustrates an elevated perspective view of the charging case showing the charging receptacles into which the charging arms of the ear bud wireless head phones are received.

FIG. 4 illustrates a perspective view of the ear bud wireless head phones and their charging arms which are charged using the charging receptacles of the charging case.

DETAILED DESCRIPTION

Figure 1:
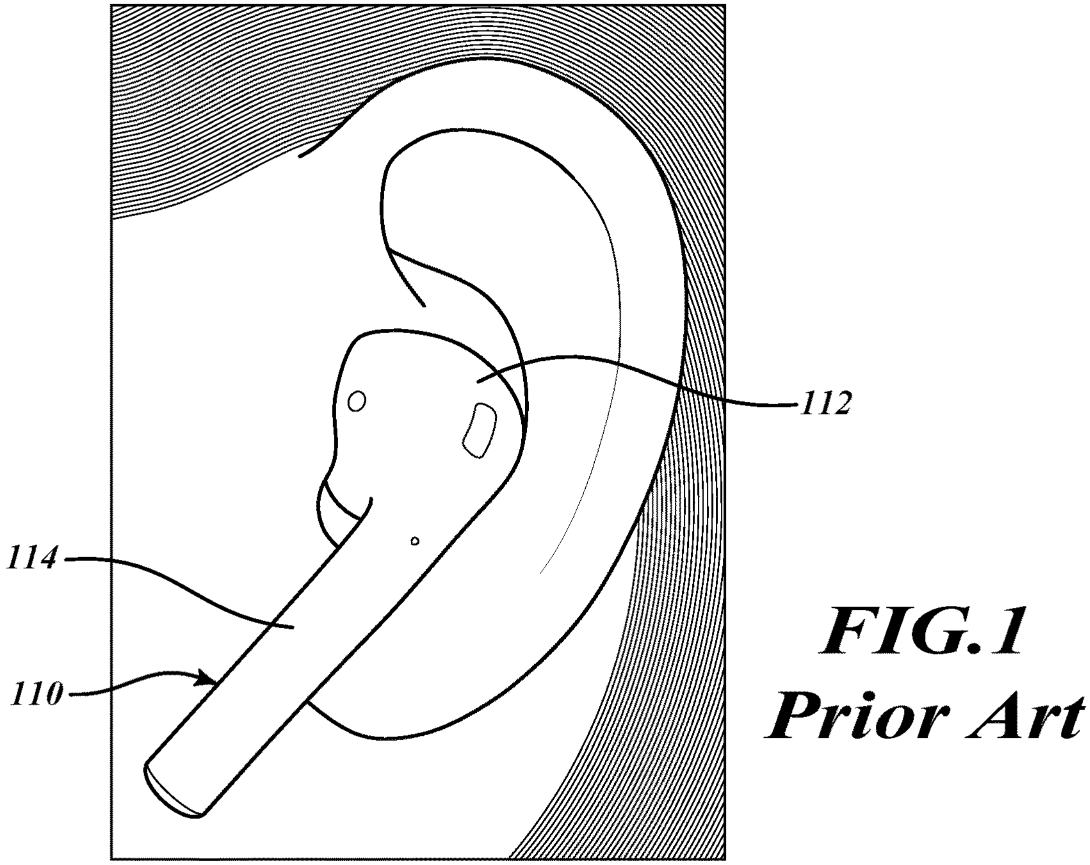
FIG.1 Prior Art
FIG. 1 illustrates an embodiment of an ear bud wireless head phone in use by a user.

Persons of ordinary skill in the art will understand that the present disclosure is illustrative only and not in any way limiting. Other embodiments and various combinations of the presently disclosed system and method readily suggest themselves to such skilled persons having the assistance of this disclosure.

Each of the features and teachings disclosed herein can be utilized separately or in conjunction with other features and teachings to provide an ear bud active use charging system and method. Representative examples utilizing many of these additional features and teachings, both separately and in combination, are described in further detail with reference to attached FIGS. 1-9. This detailed description is intended to teach a person of skill in the art further details for practicing aspects of the present teachings and is not intended to limit the scope of the claims. Therefore, combinations of features disclosed above in the detailed description may not be necessary to practice the teachings in the broadest sense, and are instead taught merely to describe particularly representative examples of the present teachings.

In the description below, for purposes of explanation only, specific nomenclature is set forth to provide a thorough understanding of the present system and method. However, it will be apparent to one skilled in the art that these specific details are not required to practice the teachings of the present system and method. Also, other methods and systems may be used.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

Moreover, the various features of the representative examples and the dependent claims may be combined in ways that are not specifically and explicitly enumerated in order to provide additional useful embodiments of the present teachings. It is also expressly noted that all value ranges or indications of groups of entities disclose every possible intermediate value or intermediate entity for the purpose of original disclosure, as well as for the purpose of restricting the claimed subject matter. It is also expressly noted that the dimensions and the shapes of the components shown in the figures are designed to help to understand how the present teachings are practiced, but not intended to limit the dimensions and the shapes shown in the examples.

Referring now to FIG. 1, a prior art ear bud is shown. An ear bud is the term for a small wireless wearable speaker that fits solely in or on the ear itself. Traditional headphone speakers with two ear pieces that are linked by a connection arm could be wireless, but they would not be referred to as ear buds since they cover the entire ears and also include a connection arm. In contrast, an ear bud is a small headphone that typically fits inside the ear against the outer opening of the ear canal. Specifically, FIG. 1 shows a left ear bud 110 shown in use in a user's left ear. In one such embodiment, the left ear bud 110 has a speaker section 112 and a charging arm 114. The user likely, but not necessarily, has a right ear bud in use in the user's right ear (not shown).

Figure 2:
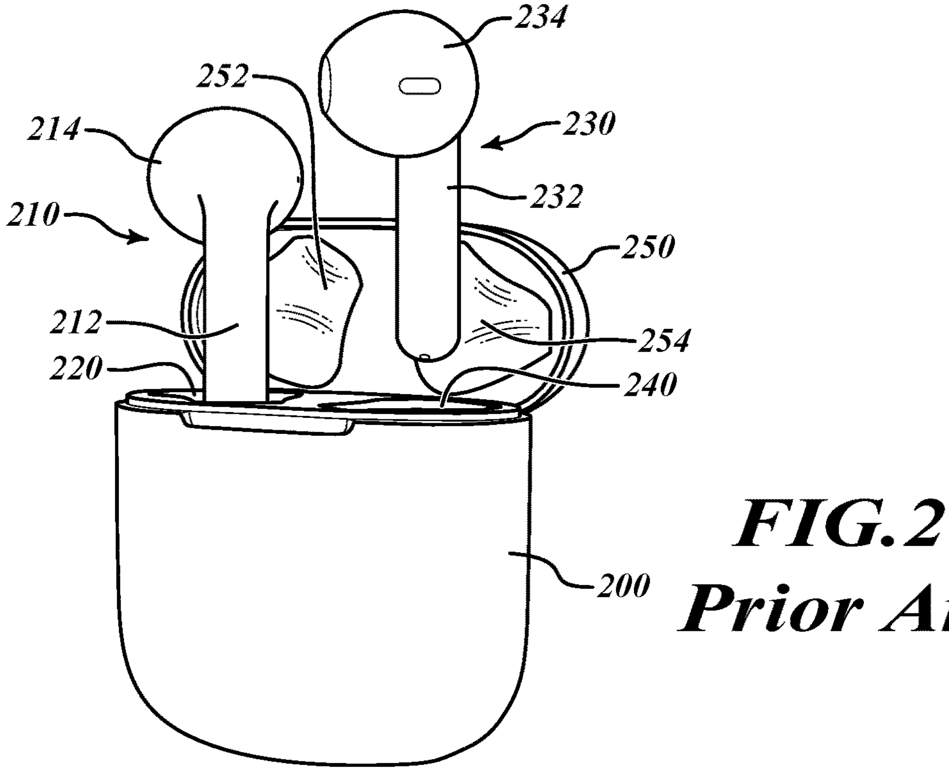
FIG.2 Prior Art
FIG. 2 illustrates an embodiment of a pair of ear bud wireless head phones being housed in a charging case for charging the ear bud wireless head phones.

Referring now to FIG. 2, prior art ear buds (left ear bud 210 and right ear bud 230) and a prior art charging case 200 are shown. The left ear bud 210 may include a charging arm 212 and a left speaker section 214 and may be an embodiment of the left ear bud 110 in FIG. 1. The prior art charging case 200 includes a left charging cavity 220, a right charging cavity 240, and a lid 250. Specifically, FIG. 2 shows a charging arm 212 of the left ear bud 210 slid part way into the left charging cavity 220 and a charging arm 232 of the right ear bud 230 positioned above but not into the right charging cavity 240. The lid 250 contains a left indent 252 that corresponds in space and size to the left speaker section 214 of the left ear bud 210 when the lid 250 is closed over the left ear bud 210. Additionally, the lid 250 contains a right indent 254 that corresponds in space and size to the right speaker section 234 of the right ear bud 230 when the lid 250 is closed over the right ear bud 230. This charging case also includes one or more batteries (not shown). In this prior art charging case 200, the left and right ear buds 210 and 230 are charged in the left and right charging cavities 220 and 240 of the charging case 200 by the one or more batteries (not shown). Unfortunately, in this prior art configuration, there is no way for the user to use the ear buds 210 and 230 when they are being charged. This is a significant technological problem that is created by wireless wearable speakers. The left and right charging cavities 220 and 240 of the charging case 200 send an electrical charge through the charging arms 212 and 232 of the left and right ear buds 210 and 230 when the charging arms of the left and right ear buds are positioned in the left and right charging cavities of the charging case.

In FIG. 3, an elevated perspective view of the prior art charging case 300 is shown that enables the left and right charging cavities 320 and 340 of the charging case 300 to be shown in more detail without the ear buds being shown. In various embodiments, the charging case 300 may be an embodiment of the charging case 200 in FIG. 2, such that the left charging cavity 320 of the charging case 300 is an embodiment of the left charging cavity 220 of the charging case 200 and the right charging cavity 340 of the charging case 300 is an embodiment of the right charging cavity 240 of the charging case 200. Notably, the left and right charging cavities 320 and 340 of the charging case 300 are shaped and sized to house the charging arms of the left and right ear buds (not shown in FIG. 3).

Referring now to FIG. 4, an elevated perspective view of the prior art left and right ear buds 410 and 430 is shown that enables the left and right charging arms 412 and 432 to be shown in more detail without the prior art charging case. Additionally, the left and right speaker sections 414 and 434 of the left and right ear buds 410 and 430 are shown in greater detail. The left and right speaker sections 414 and 434 of the left and right ear buds 410 and 430 are shaped and sized to fit the ears of an average-sized adult user. The left and right charging arms 412 and 432 are configured to point downward and forward on the sides of the user's head (as shown in FIG. 1). In various embodiments, the left ear bud 410 may be an embodiment of the left ear bud 210 in FIG. 2 and the right ear bud 430 may be an embodiment of the right ear bud 230 in FIG. 2.

Figure 5:
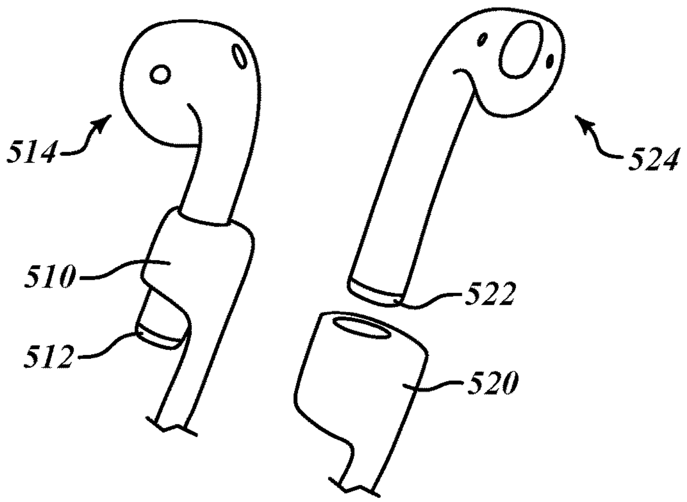
FIG. 5 illustrates a perspective view of the ear bud wireless head phones and the charging loop harnesses of the ear bud charging system.
Figure 6:
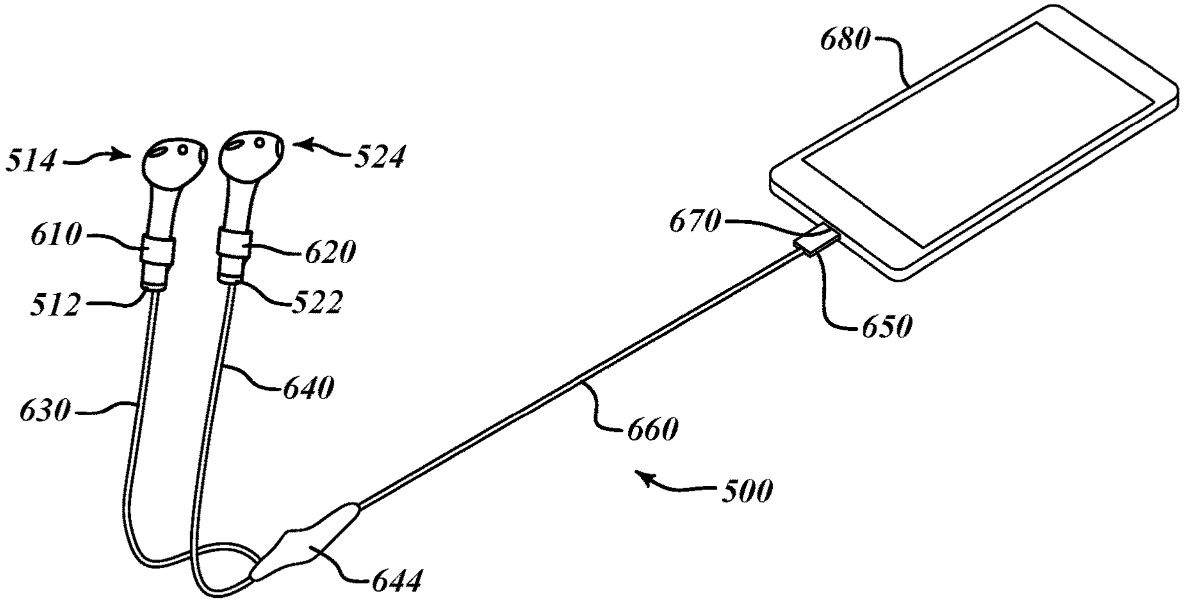
FIG. 6 illustrates a mobile device with a battery and an embodiment of the ear bud active use charging system.

Referring now to FIGS. 5 and 6, embodiments of the ear bud active use charging system 500 are shown that provide the technological solution of an active use charging system that can charge small wireless wearable speakers (e.g., ear buds) while the wireless wearable speakers are mounted on a user's head for active use. In various embodiments, the left ear bud 514 in FIGS. 5 and 6 may be an embodiment of the left ear bud 210 in FIG. 2 and the right ear bud 524 in FIGS. 5 and 6 may be an embodiment of the right ear bud 230 in FIG. 2. As shown in FIG. 5, in one or more embodiments, the ear bud active use charging system 500 includes a left loop charging harness 510 and a right loop charging harness 520 that are removably attachable to the left charging arm 512 of the left ear bud 514 and the right charging arm 522 of the right ear bud 524, respectively. In some embodiments, the loop of the left loop charging harness 510 and the loop of the right loop charging harness 520 each contain circular cavities through which the left charging arm 512 of the left ear bud 514 and the right charging arm 522 of the right ear bud 524 are inserted.

In some embodiments, each charging arm includes an inductive charging element that enables wireless charging of the left ear bud 514 via the left charging arm 512 and wireless charging the right ear bud 524 via the right charging arm 522, by the left loop charging harness 510 and the loop of the right loop charging harness 520, respectively. In such embodiments, the left loop charging harness 510 and the loop of the right loop charging harness 520 each include an inductive charging element that is used to transmit an electrical charge from the left loop charging harness 510 and the loop of the right loop charging harness 520 to the left ear bud 514 via the left charging arm 512 and wireless charging the right ear bud 524 via the right charging arm 522, respectively.

In one or more embodiments, the left loop charging harness 510 and the right loop charging harness 520 are adjustable in size to correspond to different sized charging sections of ear buds of a different configuration. In some of these embodiments, the left loop charging harness 510 and the right loop charging harness 520 are adjusted by being produce in different sizes to correspond to different sized charging arms or other charging structures (not shown), e.g., a small harness size, a medium harness size, and a large harness size. In other of these embodiments, the left loop charging harness 510 and the right loop charging harness 520 are adjustable by a user into different sizes, for example using a strap and tongue buckle (not shown). In still other of these embodiments, the left loop charging harness 510 and the right loop charging harness 520 are adjustable due to the fact that the harness material is flexible and can stretch to accommodate larger charging arms (not shown). In yet other embodiments, the left loop charging harness 510 and the right loop charging harness 520 do not contain circular shaped loops, but rather are configured in a different shape that corresponds to the shape and size of a charging section of the left ear bud and the charging section of the right ear bud that is not cylindrical (not shown). Such different shapes may be "u" shapes, "v" shapes, or other non-circular or non-closed configurations.

Referring now to FIG. 6, in some embodiments of the ear bud active use charging system, the left charging wire 630 attaches to the left loop charging harness 610 at a first end of the left charging wire, and the right charging wire 640 attaches to right loop charging harness 620 at a first end of the right charging wire. Additionally, the second end of the left charging wire 630 attaches to a junction section 644, and the second end of the right charging wire 640 also attaches to the junction section 644. In another aspect of the ear bud active use charging system, a charge cable 660 connects to a power connector 650 at a first end and the junction section 644 at a second end. In some embodiments, the power connector 650 connects to the charging port 670 of a smart phone 680, while in other embodiments that power connector 650 connects to another charging port such as, by way of example only, and not by way of limitation, a portable battery (not shown), a car charger (not shown), an electrical outlet (not shown), USB port (not shown), or the like.

Referring now to FIGS. 5 and 6, in still other aspects of some embodiments, the left loop charging harness 510 and a right loop charging harness 520 include magnetic elements that facilitate enhanced connection with the ear buds 514 and 524. This enhanced magnetic connection enables the charging connection to be maintained with greater consistency, and reduces the possibility of detachment of the loop charging harnesses 510 and 520 from the ear buds 514 and 524 due to inadvertent tugs or pulls on the charging wires 630 and 640. In some embodiments of the ear bud active use charging system that are configured to charge ear buds without standard charging arms (not shown), the magnetic elements that create the enhanced magnetic connection with the ear buds may provide the primary (or even only) connection mechanism due to the lack of a charging arm as a connection point.

Embodiments of the ear bud active use charging system are able to transfer a sufficient quantity of charge that enables use of the ear buds 514 and 524 without using any internal battery power from the ear buds. Thus, if the internal battery power from the ear buds 514 and 524 is completely drained, the ear bud active use charging system enables a user to continue using the ear buds with zero internal battery power. In some preferred embodiments, the ear bud active use charging system transfers a sufficient quantity of charge that enables use of the uncharged ear buds 514 and 524 while still charging the ear buds at the same time. Accordingly, in one or more embodiments, the ear bud active use charging system concurrently provides charging of the (uncharged or insufficiently charged) ear buds 514 and 524 while also powering use of the (uncharged or insufficiently charged) ear buds 514 and 524. In some embodiments, this charging of the uncharged or insufficiently charged ear buds 514 and 524 is performed using one or more of inductive charging, resonance charging, or radio (RF) charging.

In some embodiments of the active use charging system, the system is configured to be used in conjunction with other head-mounted electronics, such as a Virtual Reality headset (e.g., Oculus/Meta Quest 2, Valve Index, HTC Vive Pro 2, or HP Reverb G2), or Augmented Reality glasses (e.g., Google glasses), instead of wireless wearable speakers, such as iPods. In such embodiments, the loop charging harnesses are replaced with other charging connectors that are configured to removably secure to the headset or electronically enhanced glasses. Furthermore, in such embodiments, magnetic connection elements may also be utilized to help prevent accidental disconnection of the charging connectors.

Figure 7:
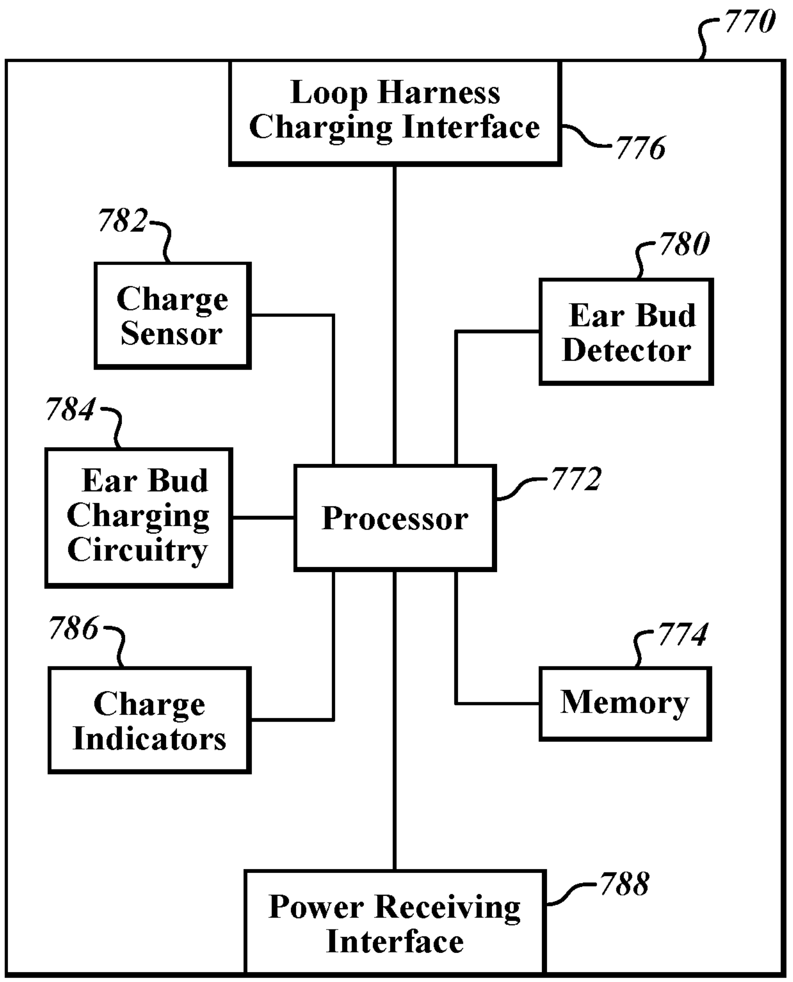
FIG. 7 illustrates a schematic diagram for the ear bud charging controller system of the ear bud active use charging system.

As shown in FIG. 7, in some embodiments, the ear bud active use charging system also includes an ear bud charging controller system 770 having a processor 772 and a memory 774. The memory 774 is arranged to store computer instructions that are executable by the processor 772. Additionally, in some embodiments the ear bud charging controller system 770 also includes a loop harness interface 776, an ear bud detector 780, a charge sensor 782, ear bud charging circuitry 784, a charge indicator 786, and power receiving interface 788. In some embodiments, the ear bud charging controller system 770 is positioned in the junction section 644, while in other embodiments, the ear bud charging controller system 770 is not contained within the junction section 644. For example, in some embodiments, the ear bud charging controller system 770 may be part of or incorporated with the smart phone 680 in FIG. 6. In other embodiments, the smart phone 680 itself may operate as the ear bud charging controller system 770. In yet other embodiments, the ear bud charging controller system 770 may be part of or within another computing component or system, such as, for example, a vehicle head unit or a charging brick that plugs into an outlet.

With respect to FIGS. 5 and 7, in one or more embodiments, the loop harness interface 776 of the ear bud charging controller system 770 communicates with the left loop charging harness 510 and the right loop charging harness 520. Additionally, the ear bud detector 780 of the ear bud charging controller system 770 detects if the left ear bud 514, the right ear bud 524, or both are connected to one or more of the left loop charging harness 510 and the right loop charging harness 520. This detection by the ear bud detector 780 is facilitated by the communication with the ear buds 514 and 524 via the loop harness interface 776 through the loop charging harnesses 510 and 520. In some embodiments, ear bud detector 780 includes one or more sensors that detect when the left charging arm 512 of the left ear bud 514 is placed in the left loop charging harness 510, the right charging arm 522 of the right ear bud 524 is placed in the right loop charging harness 520, or both. In some such embodiments, earbud detector 780 includes a sensor, such as by way of example only and not by way of limitation, a mechanical sensor, an proximity sensor, a capacitive sensor, a magnetic sensor, or other known sensor. Further, the charge sensor 782 of the ear bud charging controller system 770 determines an initial charged state of the batteries (not shown) in the left ear bud 514 and the right ear bud 524. For example, in one embodiment the charge sensor 782 of the ear bud charging controller system 770 may determine that the initial charged state of the batteries (not shown) in the ear buds 514 and 524 is 21% charged.

Continuing, in some embodiments of the ear bud active use charging system, the ear bud charging circuitry 784 of the ear bud charging controller system 770 applies a charging profile to the batteries (not shown) in the ear buds 514 and 524 after the charge sensor 782 determines an initial charged state of the one or more ear buds 514 and 524. In another aspect of some embodiments, the charging profile may be selected from one of multiple charging profiles that are designed for various circumstances. For example, one charging profile may be configured for rapid charging, another charging profile may be configured for electrical efficiency, and still another profile may be configured to cause the lowest amount of strain and potential degradation on the batteries being charged. Furthermore, one charging profile may be employed when the ear bud active use charging system is being charged from a smart phone, another charging profile may be employed when the ear bud active use charging system is being charged from a portable battery, and still another charging profile may be employed when the ear bud active use charging system is being charged from an electrical outlet.

In some embodiments of the ear bud active use charging system, the charge sensor 782 of the ear bud charging controller system 770 monitors the present charging status (e.g., charging or not charging) of the batteries (not shown) in the ear buds 514 and 524 and charged state (e.g., 78% charged) of the batteries in the ear buds. Additionally, in another aspect of some embodiments, the charge indicator 786 of the ear bud charging controller system 770 displays the present charging status (e.g., no light for not charging, green light for currently charging, red light for charging completed) and the charged state of the one or more wireless ear buds 514 and 524. Further, in one or more embodiments, the ear bud charging circuitry 784 of the ear bud charging controller system 770 reduces charging the one or more wireless ear buds 514 and 524 when the battery in each of the one or more wireless ear buds is fully charged or within a predetermined charge threshold of fully charged.

For example, in one or more embodiments, the ear bud charging controller system 770 reduces charging when within 5%, 10%, or 20% (or an intervening percentage) of the battery being fully charged to help prevent degradation of the batteries and otherwise extend the battery life. In some embodiments, the computer instructions to reduce the charging profile to the one or more wireless ear buds more specifically include instructions to cease charging of the one or more wireless ear buds 514 and 524. In other embodiments, the computer instructions to reduce the charging profile to the one or more wireless ear buds more specifically include instructions to reduce further charging of the ear buds to a trickle charge.

Figure 8:
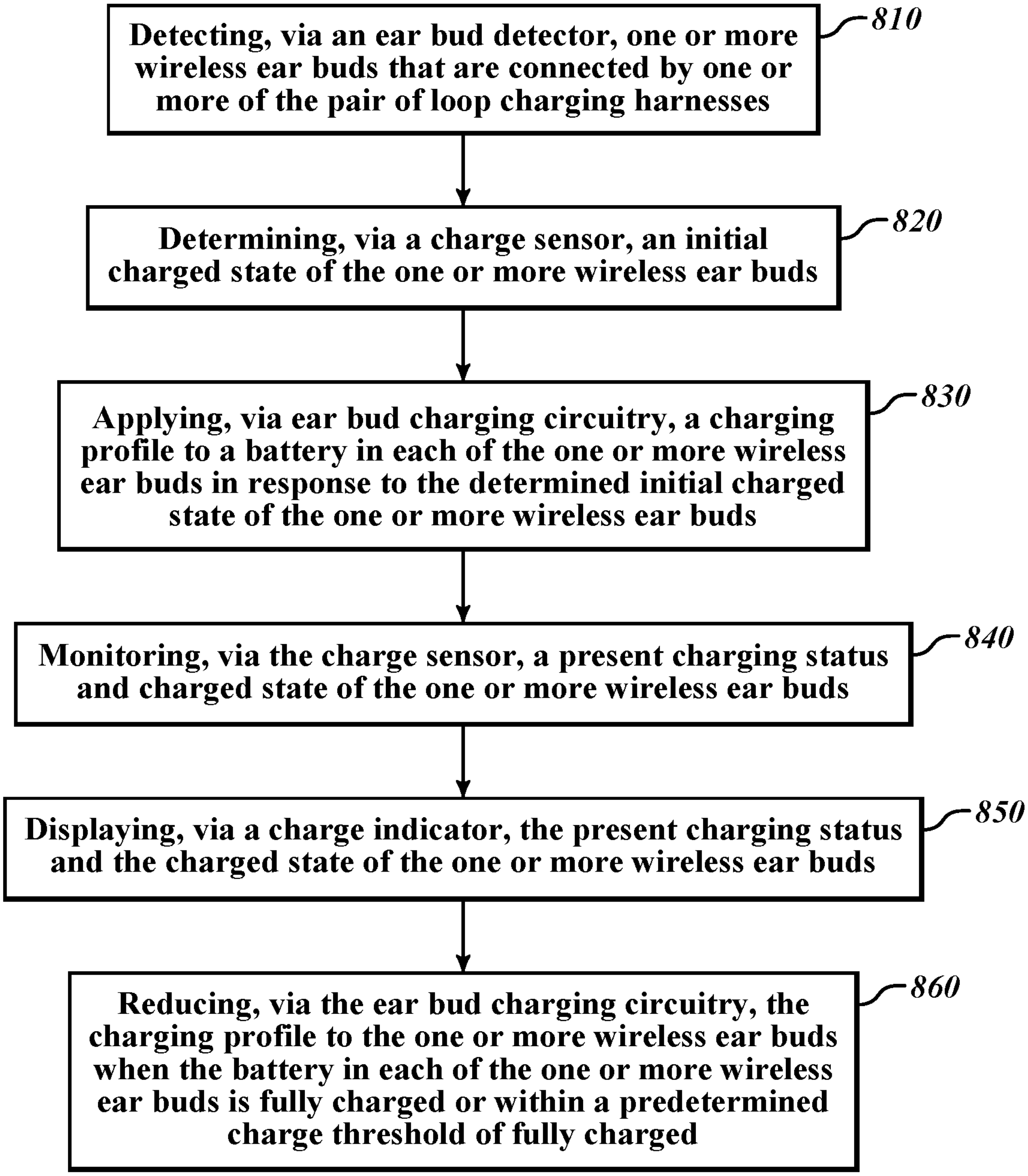
FIG. 8 illustrates a logic flow diagram for the ear bud active use charging method.

FIG. 8 is a logic diagram showing an ear bud charging controller method with a charging control system for charging wireless ear buds while they are being used by a user. As shown in FIGS. 7 and 8, at operation 810, the method detects, via an ear bud detector 780, one or more wireless ear buds that are connected by one or more of the pair of loop charging harnesses. The method then proceeds to operation 820. At operation 820, the method determines, via a charge sensor 782, an initial charged state of the one or more wireless ear buds. The method then proceeds to operation 830. At operation 830, the method applies, via ear bud charging circuitry 784, a charging profile to a battery in each of the one or more wireless ear buds in response to the determined initial charged state of the one or more wireless ear buds. The method then proceeds to operation 840. At operation 840, the method monitors, via the charge sensor, a present charging status and charged state of the one or more wireless ear buds. The method then proceeds to operation 850. At operation 850, the method displays, via a charge indicator 786, the present charging status (e.g., charging or not charging) and the charged state (e.g., 73% charged) of the one or more wireless ear buds. The method then proceeds to operation 860. At operation 860, the method reduces, via the ear bud charging circuitry 784, the charging profile to the one or more wireless ear buds when the battery in each of the one or more wireless ear buds is fully charged or within a predetermined charge threshold of fully charged.

Figure 9:
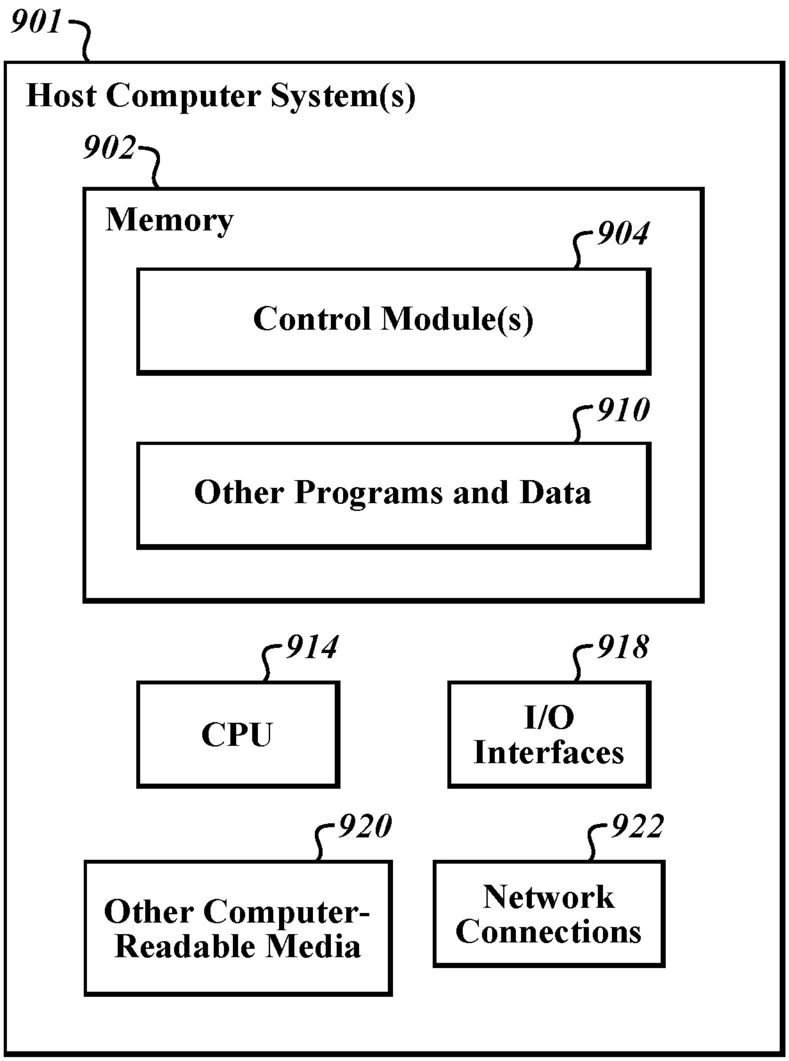
FIG. 9 illustrates a system diagram that describes an example implementation of a computing system(s) for implementing embodiments described herein.

FIG. 9 shows a system diagram that describes another example implementation of a computing system(s) for implementing embodiments described in the method of FIG. 8. Specifically, the system diagram of FIG. 9 shows some additional aspects of some components of one or more embodiments, such as I/O Interfaces 918 and network connections 922, in further detail than was described in FIG. 7. The functionality described herein for an ear bud charging controller system, can be implemented either on dedicated hardware, as a software instance running on dedicated hardware, or as a virtualized function instantiated on an appropriate platform, e.g., a cloud infrastructure. In some embodiments, such functionality may be completely software-based and designed as cloud-native, meaning that its agnostic to the underlying cloud infrastructure, allowing higher deployment agility and flexibility.

In particular, shown is example controller system(s) 901. In some embodiments, one or more special-purpose computing systems may be used to implement the functionality described herein. Accordingly, various embodiments described herein may be implemented in software, hardware, firmware, or in some combination thereof. Host computer system(s) 901 may include memory 902, one or more central processing units (CPUs) 914, I/O interfaces 918, other computer-readable media 920, and network connections 922.

Memory 902 may include one or more various types of non-volatile and/or volatile storage technologies. Examples of memory 902 may include, but are not limited to, flash memory, hard disk drives, optical drives, solid-state drives, various types of random-access memory (RAM), various types of read-only memory (ROM), other computer-readable storage media (also referred to as processor-readable storage media), or the like, or any combination thereof. Memory 902 may be utilized to store information, including computer-readable instructions that are utilized by CPU 914 to perform actions, including those of embodiments described herein.

Memory 902 may have stored thereon control module(s) 904. The control module(s) 904 may be configured to implement and/or perform some or all of the functions of the systems, components and modules described herein for an ear bud charging controller system. Memory 902 may also store other programs and data 910, which may include rules, databases, application programming interfaces (APIs), software platforms, cloud computing service software, network management software, network orchestrator software, network functions (NF), AI or ML programs or models to perform the functionality described herein, user interfaces, operating systems, other network management functions, other NFs, etc.

Network connections 922 are configured to communicate with other computing devices to facilitate the functionality described herein. In various embodiments, the network connections 922 include transmitters and receivers (not illustrated), cellular telecommunication network equipment and interfaces, and/or other computer network equipment and interfaces to send and receive data as described herein, such as to send and receive instructions, commands and data to implement the processes described herein. I/O interfaces 918 may include a video interface, other data input or output interfaces, or the like. Other computer-readable media 920 may include other types of stationary or removable computer-readable media, such as removable flash drives, external hard drives, or the like Some methods, functions, steps, or features have been described as being executed by corresponding software by a processor. It is understood that any methods, functions, steps, features, or anything related to the systems disclosed herein may be implemented by hardware, software (e.g., firmware), or circuits despite certain methods, functions, steps, or features having been described herein with reference to software corresponding thereto that is executable by a processor to achieve the desired method, function, or step. It is understood that software instructions may reside on a non-transitory medium such as one or more memories accessible to one or more processors in the systems disclosed herein. For example, where a computing device receives data, it is understood that the computing device processes that data whether processing the data is affirmatively stated or not. Processing the data may include storing the received data, analyzing the received data, and/or processing the data to achieve the desired result, function, method, or step. It is further understood that input data from one computing device or system may be considered output data from another computing device or system, and vice versa. It is yet further understood that any methods, functions, steps, features, results, or anything related to the systems disclosed herein may be represented by data that may be stored on one or more memories, processed by one or more computing devices, received by one or more computing devices, transmitted by one or more computing devices, and the like.

The foregoing description, for purposes of explanation, uses specific nomenclature and formula to provide a thorough understanding of the disclosed embodiments. It should be apparent to those of skill in the art that the specific details are not required in order to practice the disclosure. The embodiments have been chosen and described to best explain the principles of the disclosed embodiments and its practical application, thereby enabling others of skill in the art to utilize the disclosed embodiments, and various embodiments with various modifications as are suited to the particular use contemplated. Thus, the foregoing disclosure is not intended to be exhaustive or to limit the disclosure to the precise forms disclosed, and those of skill in the art recognize that many modifications and variations are possible in view of the above teachings.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the breadth and scope of a disclosed embodiment should not be limited by any of the above described exemplary embodiments, but should be defined only in accordance with the following claims and their equivalents.

The invention claimed is:

1. An ear bud active use charging system, comprising:

a pair of loop charging harnesses that interface with one or more ear buds;

a pair of charging wires each having a first end and a second end, wherein the first end of each pair of charging wires is connected to one of the pair of loop charging harnesses, and wherein the second end of each pair of charging wires is connected to a junction section;

a power receiving interface;

a charge cable that connects to the power receiving interface at a first end and the junction section at a second end; and an ear bud charging controller system having a processor and a memory, the memory arranged to store computer instructions, the computer instructions executable by the processor that cause the processor to:

detect, via an ear bud detector, one or more wireless ear buds that are connected by one or more of the pair of loop charging harnesses;

determine, via a charge sensor, an initial charged state of the one or more wireless ear buds;

apply, via an ear bud charging circuitry, a charging profile to a battery in each of the one or more wireless ear buds in response to the determined initial charged state of the one or more wireless ear buds;

monitor, via the charge sensor, a present charging status and charged state of the one or more wireless ear buds;

display, via a charge indicator, the present charging status and the charged state of the one or more wireless ear buds; and reduce, via the ear bud charging circuitry, the charging profile to the one or more wireless ear buds when the battery in each of the one or more wireless ear buds is fully charged or within a predetermined charge threshold of fully charged.

2. The system of claim 1, wherein the computer instructions to reduce, via the ear bud charging circuitry, the charging profile to the one or more wireless ear buds, further comprise: cease further charging of the ear buds.

3. The system of claim 1, wherein the computer instructions to reduce, via the ear bud charging circuitry, the charging profile to the one or more wireless ear buds, further comprises: reduce further charging of the ear buds to a trickle charge.

4. The system of claim 1, wherein the charge cable is configured to interface with one or more of a phone charging port, a mobile battery, or an electrical outlet.

5. The system of claim 1, wherein the pair of loop charging harnesses include magnetic elements that facilitate enhanced connection with the ear buds.

6. The system of claim 1, wherein a size of the loop charging harnesses is adjustable to fit multiple styles of charging arms of wireless headphones.

7. The system of claim 1, wherein the ear bud active use charging system transfers a quantity of charge that enables use of the ear buds without internal battery power from the ear buds.

8. The system of claim 1, wherein the charge indicator displays an indication that the ear bud active use charging system is actively charging the one or more wireless ear buds.

9. The system of claim 1, wherein the charge indicator displays a current percent charging status while the ear bud active use charging system is actively charging the one or more wireless ear buds.

10. The system of claim 1, wherein the ear bud active use charging system transmits power from the pair of loop charging harnesses to the one or more wireless ear buds using inductive charging.

11. An ear bud active use method, comprising:

detecting, via an ear bud detector, one or more wireless ear buds that are connected by one or more of a pair of loop charging harnesses;

determining, via a charge sensor, an initial charged state of the one or more wireless ear buds;

applying, via an ear bud charging circuitry, a charging profile to a battery in each of the one or more wireless ear buds in response to the determined initial charged state of the one or more wireless ear buds;

monitoring, via the charge sensor, a present charging status and charged state of the one or more wireless ear buds;

displaying, via a charge indicator, the present charging status and the charged state of the one or more wireless ear buds; and reducing, via the ear bud charging circuitry, the charging profile to the one or more wireless ear buds when the battery in each of the one or more wireless ear buds is fully charged or within a predetermined charge threshold of fully charged.

12. The method of claim 11, further comprising: enabling a charge cable to interface with one or more of a phone charging port, a mobile battery, or an electrical outlet.

13. The method of claim 11, further comprising: enhancing connection with the wireless ear buds using magnetic elements in the pair of loop charging harnesses.

14. The method of claim 11, further comprising: enabling adjustment of a size of the loop charging harnesses to fit various styles of charging arms of wireless headphones.

15. The method of claim 11, further comprising: transferring a quantity of charge that enables use of the wireless ear buds without internal battery power from the wireless ear buds.

16. The method of claim 11, further comprising: displaying a current percent charging status on the charge indicator while an ear bud active use charging system is actively charging the one or more wireless ear buds.

17. The method of claim 11, further comprising: transmitting power from the pair of loop charging harnesses to the one or more wireless ear buds using inductive charging.

18. A head-mounted electronics active use system, comprising:

a pair of loop charging harnesses that interface with one or more head-mounted electronics;

a pair of charging wires each having a first end and a second end, wherein the first end of each pair of charging wires is connected to one of the pair of loop charging harnesses, and wherein the second end of each pair of charging wires is connected to a junction section;

a power receiving interface;

a charge cable that connects to the power receiving interface at a first end and the junction section at a second end; and a head mounted electronics charging controller system having a processor and a memory, the memory arranged to store computer instructions, the computer instructions executable by the processor that cause the processor to apply, via an ear bud charging circuitry, a charging profile to a battery in each of the head-mounted electronics in response to a determined initial charged state of the one or more head-mounted electronics.

19. The system of claim 18, wherein the pair of loop charging harnesses are configured to interface with one or more of ear bud charging arms, a Virtual Reality headset charging interface, or an Augmented Reality glasses charging interface.

* * * * *